3,291,737
LUBRICATING OIL COMPOSITIONS CONTAINING POLYMERS OF LOWER ALKYL METHACRYLATES AND METHOD OF PREPARING THEM
George S. Saines, Fishkill, and Abraham Morduchowitz, Spring Valley, N.Y., assignors to Texaco Inc., New York, N.Y., a corporation of Delaware
No Drawing. Filed Dec. 23, 1965, Ser. No. 516,130
4 Claims. (Cl. 252—56)

This invention relates to the preparation of lubricating oil compositions containing polymers of lower alkyl methacrylates in sufficient quantities to substantially increase the viscosity index of the lubricating oil. More particularly, this invention is directed to solubilizing normally oil-insoluble polymers of lower alkyl methacrylates by admixing therewith graft copolymers of a polar methacrylate and non-polar methacrylate.

The rate of change of viscosity of lubricating oil with temperature is called the viscosity index or V.I. Oils having a high viscosity index exhibit a smaller change in viscosity with temperature variation than those with a low V.I. In such applications as automobile and aircraft engine lubrication, where a wide range of temperature is encountered, lubricating oils having high viscosity indices are highly desirable and often critically necessary.

It is known that small quantities of long chain polymers of such hydrocarbons as isobutylene and similar aliphatic hydrocarbons, styrene, alkylstyrene, acrylates, methacrylates and esters will substantially increase the V.I. of petroleum lubricants. In particular, polymers of methacrylic acid esters have been used extensively as "V.I. improvers."

It is a commonly accepted concept that the viscosity improvement imparted by polymers to mineral oil mixtures is due to the differences in size and shape of the polymer molecules at different temperatures and in particular is dependent upon a limited polymer solubility in the oil at lower temperature. This minimal solubility results in a "balling-up" or collapsing of the polymer chain into coils or spheres which contribute relatively slightly to the viscosity of the oil at this lower temperature. As the temperature increases the "balled-up" chains extend, contributing markedly to the viscosity of the fluid. This overall effect is to reduce the rate of change of viscosity with temperature. Stated simply, the addition of certain polymers to oil reduces the tendency of the oil to "thin-out" at higher temperatures.

Solubility is a function of the solvating power of the solvent towards the solute and depends on the composition of both. In the case of polymeric lubricating oil additives, the solvent is a hydrocarbon mixture, a relatively non-polar medium. The polarity of the solute molecule can be varied in the case of alkyl methacrylate polymers by altering the size of the alkyl group.

Generally, the lower alkyl methacrylate polymers are oil insoluble while the polymers of the higher alkyl methacrylates are soluble in oil. This is a gradual and progressive change. As the size of the alkyl group in a poly(alkyl methacrylate) is increased, the non-polar segment is increased which in turn increases the solubility of the polymer in oil solvents. This causes the solvated polymer molecule to assume a more extended state, and as a result, it contributes more to the viscosity of the solution than would a more polar polymer. The ultimate result is that when energy in the form of heat is applied, little more solvation and extension of the polymer is possible. Thus little further contribution to the viscosity occurs and the viscosity index is not increased significantly. On the other hand, if the polymer composition is such that the molecule is solvated only enough to hold it in solution in a tightly coiled state, the application of heat will increase the degree of solvation, causing an extension of the molecule so that its contribution to the viscosity will increase, resulting in an appreciable viscosity index increase. In qualitative terms, therefore, the viscosity index is a function of the composition of the polymer—the more soluble polymers being poorer viscosity index improvers while the polymers which are not very soluble form small coils and are good V.I. improvers.

It follows then that polymers of the lower alkyl methacrylates, being more polar, are less soluble and excellent V.I. improvers at higher temperatures. There reaches a point where the solubility of these lower alkyl polymers will be too low for practical use although they are theoretically the best V.I. improvers of the methacrylates. Unless their solubility in lubricating oil can be modified in some way, the potential of these polymers cannot be realized.

It is an object of this invention to solubilize lower alkyl methacrylate polymers in mineral oil.

Another object is to prepare lubricating oils with improved viscosity indices.

We have discovered that these and other objects can be achieved by admixing a graft copolymer of methacrylates with a major amount of a mineral oil and a minor amount, sufficient to improve the viscosity index of said oil, of a polymer of a lower alkyl methacrylate.

The $C_1$–$C_8$ alkyl methacrylate polymers are effective V.I. improvers but are either insoluble or of such limited solubility in mineral oil as to be of little practical value. Among those homopolymers which are rendered particularly useful by our invention are those prepared from such monomers as the methyl, butyl and hexyl methacrylates although polymers of any of the $C_1$–$C_8$ straight chain alkyl methacrylates or their isomers may be solubilized in mineral oil by use of our invention.

We have found that to achieve the desired degree of solubility of the lower alkyl methacrylate polymers, the graft copolymer of methacrylates must be comprised of a substantially polar portion and a substantially non-polar portion. This may be achieved by grafting together a polymer of a $C_3$–$C_8$ alkyl methacrylate which is essentially polar and a polymer of a $C_{10}$–$C_{18}$ alkyl methacrylate which is essentially non-polar. It should be understood that for convenience the lower methacrylate polymers making up the graft copolymers are referred to as "alkyl" methacrylates. As used herein in connection with these particular esters the term "alkyl" is to be understood to include not only alkyls but also cycloalkyls and epoxyalkyls.

The polymer to be solubilized may be prepared by any of the polymerization methods well known in the art. One particularly useful method, disclosed in U.S. Patent 2,471,959, is the free radical polymerization of a solution of the monomer in an inert hydrocarbon solvent. This method employs an initiator, such as azobisisobutyronitrile.

The graft copolymer may be prepared by any of the known polymer grafting techniques, as for example, grafting monomers onto preformed polymers by means of high energy irradiation as disclosed in U.S. Patent 3,087,875. One particularly useful method of grafting together methacrylate polymers is disclosed in commonly assigned and copending application Serial No. 516,114, filed simultaneously herewith. This method involves homopolymerizing a first methacrylate ester whose alcohol portion is susceptible to hydroperoxide formation. The free radical polymerization method mentioned above may be employed to prepare the homopolymer. This polymer, which forms the backbone or trunk chain for the graft copolymer, is oxidized to the hydroperoxide and a second methacrylate added. The hydroperoxides are then decomposed to initiate the free radical polymerization of the second monomers at the hydroperoxide sites. The resultant copolymer is a macromolecule in which the second polymeric chain exists as branches on the primary or trunk chain.

When preparing the graft copolymers by the suggested method, among the $C_3$-$C_8$ alkyl methacrylates which may be utilized as the first ester monomer are a first group which are the methacrylate esters of $C_3$-$C_8$ alkyl secondary alcohols, for example, isopropanol, 2-butanol, 2-pentanol, 3-pentanol, 2-hexanol, 3-hexanol, 2-heptanol, 3-heptanol, 4-heptanol, 2-octanol, 3-octanol and 4-octanol. The second group of useful lower molecular weight monomers are the methacrylate esters of cycloalkyl secondary alcohols, for example, cyclopentanol and cyclohexanol. A third group are the methacrylate esters of the epoxy alcohols containing three to eight carbons, for example 2,3-epoxy-1-propanol and 2,3-epoxy-2-ethyl-1-hexanol.

The heavier alkyl methacrylates which usefully serve as the grafted chains on the $C_3$-$C_8$ alkyl methacrylate polymers include methacrylate esters of such $C_{10}$-$C_{18}$ primary alcohols as isodecanol, 1-decanol, 1-undecanol, 1-dodecanol, 1-tridecanol, 1-tetradecanol, 1-pentadecanol, 1-hexadecanol, 1-heptadecanol, 1-octadecanol and isomers thereof.

All of the methacrylates whose polymers are used as the backbone chain have one structural feature which makes them susceptible to hydroperoxide formation, each contains a hydrogen atom attached to a secondary carbon atom which is in alpha position to an oxygen atom.

In order to solubilize the methacrylate polymer, special equipment and/or elevated temperatures and pressures are not necessary. The action of the graft copolymer is effected by merely admixing under normal room conditions minor amounts of the polymer and the graft polymer with a major quantity of the base oil. As a general rule, relatively large amounts of graft copolymer are needed to solubilize the polymer and often exceed the amount of polymer. The weight ratio of graft copolymer to polymer may be between 2:1 and 8:1 although a range of 4:1 and 6:1 is usually satisfactory in most applications. The exact amount of the polymeric materials will be dependent on the quantity of methacrylate polymer necessary to produce the desired improvement in viscosity index. The combined weight percent of copolymer and polymer in the final blend is often between 0.5 and 1.50 although a range of 0.25 to 2.5 percent may be necessary in some instances.

For example, we found that a graft copolymer of poly(octadecyl methacrylate) and poly(cyclohexyl methacrylate) would solubilize a homopolymer of butyl methacrylate in an automotive lubricating oil whereas the poly(butyl methacrylate) alone was not soluble in the motor oil. The structure of the graft copolymer must have effected the solubilizing since a similar blend with poly(octadecyl methacrylate), which is readily soluble in oil, resulted in the precipitation of the poly(butyl methacrylate).

We do not know the mechanism of the solubilizing action of the graft copolymer on the lower alkyl methacrylate polymer. Graft copolymers which themselves are oil soluble may associate with the insoluble lower alkyl polymer to a degree sufficient to effect its solution.

The following examples illustrate our invention and present the properties of some oil compositions containing methacrylate polymers solubilized by graft copolymers.

*Example I*

This illustrates the preparation of a graft copolymer utilized in this invention.

In a dry 1 liter three-necked round bottom flask equipped with stirrer, condenser, gas inlet tube and thermometer were placed 50 grams of cyclohexyl methacrylate, 500 ml. of benzene and 0.1 gram of azobisisobuyronitrile. The resulting solution was vigorously purged with prepurified nitrogen for ninety minutes. A nitrogen atmosphere was maintained as the solution was refluxed by heating the flask in an oil bath maintained at 90° C. Samples were withdrawn periodically to follow the polymerization by means of refractive index determinations. After refluxing for two hours, there was no further increase in refractive index. The solution temperature was then lowered to 55° C. and the nitrogen atmosphere replaced by a vigorous stream of air which was bubbled through the solution for six hours. Additions of 100 grams of octadecyl methacrylate and 150 grams of benzene were then made to the vessel, the flow of air was discontinued and the vessel contents were maintained at 40° C. while purged with prepurified nitrogen for one hour. Following this, the reaction mixture solution was refluxed for about four hours until constant refractive index was achieved. The reaction product was cooled and the polymer isolated by precipitation from two liters of a 1:1 acetone-methanol solution. The precipitated polymer was separated from the supernatant solution, dissolved in refluxing chloroform and further purified by reprecipitation from acetone-methanol solution to yield 79.7 grams of a polymer having an intrinsic viscosity of 0.58 in benzene.

*Example II*

This shows how the methacrylate polymers utilized in this invention may be prepared.

A polymer of butyl methacrylate was prepared essentially as was the cyclohexyl methacrylate polymer of Example I. 50 grams of butyl methacrylate were polymerized in 500 ml. of benzene at approximately 75° C. under a nitrogen atmosphere with 0.1 gram of azobisisobutylronitrile serving as an initiator. The polymerization was continued until the refractive index of the solution was constant. The polymer, which was recovered and purified with an acetone-methanol solution, exhibited an intrinsic viscosity of 0.6 in benzene.

A second polymer of butyl methacrylate, prepared in a similar fashion, had an intrinsic viscosity in benzene of 1.09.

*Example III*

This example shows how a graft copolymer solubilized a methacrylate polymer in petroleum oil.

A series of motor oil mixtures was prepared from the same motor oil base. The composition of each mixture and a qualitative solubility evaluation are set forth in the following table:

| Mixture | Composition | Solubility of Poly(butyl methacrylate) in Mixture |
|---|---|---|
| A | Motor oil composition containing 0.1875 wt. percent poly(butyl methacrylate). | Insoluble. |
| B | Mixture A plus 1.0625 wt. percent poly (octadecyl methacrylate). | Do. |
| C | Mixture A plus 1.0625 wt. percent graft copolymer of poly(octadecyl methacrylate) and poly(cyclohexyl methacrylate). | Soluble. |

*Example IV*

This example shows the viscosity improvement effected by solubilizing the normally oil-insoluble lower alkyl methacrylate polymers.

The physical properties of motor oil compositions prepared from a motor oil base stock, a methacrylate polymer and a graft copolymer of methacrylates are:

| Motor Oil Blend | Composition | Wt. percent in Blend | Kin Vis. 100° F. | (CS.) 210° F. | Viscosity Index | Pour Point, ° F. |
|---|---|---|---|---|---|---|
| | Motor Oil Composition | | 35.0 | 5.55 | 102 | 0 |
| | plus | | | | | |
| D | Graft Copolymer of Example I | 1.0625 | | | | |
| | and | | 49.0 | 7.73 | 128 | −5 |
| | Polymer of Example II, Intrinsic Vis.=0.6 | 0.1875 | | | | |
| E | Graft Copolymer of Example I | 1.00 | | | | |
| | and | | 48.3 | 7.61 | 127 | −20 |
| | Polymer of Example II, Intrinsic Vis.=1.09 | 0.25 | | | | |

Obviously many modifications and variations of the invention as hereinbefore set forth may be made without departing from the spirit and scope thereof. Therefore, only such limitations should be imposed as are indicated in the appended claims.

We claim:

1. A method of solubilizing a $C_1$-$C_8$ methacrylate polymer in a mineral oil which comprises:

admixing a graft copolymer of methacrylates containing a polar portion and a non-polar portion with a major amount of a mineral oil and a minor amount of a $C_1$-$C_8$ alkyl methacrylate polymer, sufficient to improve the viscosity index of said oil, the weight ratio of said copolymer to said polymer being between 2:1 and 8:1, the combined weight percent of said copolymer and said polymer being between 0.25 and 2.5 percent of the mixture, said polar portion comprising a member selected from the group consisting of a $C_3$-$C_8$ alkyl methacrylate, a $C_5$-$C_6$ cycloalkyl methacrylate and a $C_3$-$C_8$ epoxyalkyl methacrylate and said non-polar portion comprising a $C_{10}$-$C_{18}$ alkyl methacrylate.

2. A method according to claim 1 wherein said polar portion is cyclohexyl methacrylate, said non-polar portion is octadecyl methacrylate, said polymer is poly(butyl methacrylate) and said mineral oil is a petroleum lubricating oil.

3. A composition of matter which comprises the product produced by the method of claim 1.

4. A composition of matter which comprises the product produced by the method of claim 2.

References Cited by the Examiner

UNITED STATES PATENTS

| | | | |
|---|---|---|---|
| 2,604,453 | 7/1952 | Popkin | 252—56 |
| 3,052,648 | 9/1962 | Bauer | 260—885 |
| 3,087,875 | 4/1963 | Graham et al. | 260—885 |
| 3,226,326 | 12/1965 | Lorensen et al. | 252—57 |
| 3,238,133 | 3/1966 | Lorensen | 252—56 |

References Cited by the Applicant

UNITED STATES PATENTS

| | | |
|---|---|---|
| 2,965,571 | 12/1960 | Wuellner et al. |
| 2,965,572 | 12/1960 | Wuellner et al. |

DANIEL E. WYMAN, *Primary Examiner.*

W. H. CANNON, *Assistant Examiner.*